United States Patent [19]

Lalonde

[11] Patent Number: 4,693,440
[45] Date of Patent: Sep. 15, 1987

[54] REFRESHMENT CUP HOLDER

[76] Inventor: Albert Lalonde, 1045 Connery Ave., Ottawa, Ontario, Canada, K1G 2N9

[21] Appl. No.: 882,690

[22] Filed: Jul. 7, 1986

[51] Int. Cl.$^4$ ............................................. A47G 23/02
[52] U.S. Cl. ...................................... 248/154; D7/70; 220/85 H; 248/313; 248/316.5
[58] Field of Search ...................... 248/154, 311.2, 313, 248/314, 316.1, 316.5, 523, 525, 526, 309.1, 146, 316.2, 316.3, DIG. 7; D7/70; 220/85 H, 85 R

[56] References Cited

U.S. PATENT DOCUMENTS 2,743,893  5/1956  Johnston, Jr. ....................... 248/146
2,750,140  6/1956  Smith .................................... 248/154
3,301,512  1/1967  Nyberg ........................... 248/316.5 X

FOREIGN PATENT DOCUMENTS 9078    8/1900  Norway ............................... 248/523
29128   of 1906  United Kingdom ................ 248/154

Primary Examiner—J. Franklin Foss
Assistant Examiner—David L. Talbott
Attorney, Agent, or Firm—Stanley E. Johnson

[57] ABSTRACT

A holder for a cup of refreshment having a jaw that closes and opens in response to respectively placing the cup of refreshment in the holder and removing it therefrom. The holder has a pair of pivotally mounted jaw members that have an upper part to grasp the container therebetween and a lower part that supports the container. Pivotal movement of the jaw members is interrelated and the center of gravity of the same relative to their respective pivotal mountings is such that the jaw is biased to a normally open position.

2 Claims, 6 Drawing Figures

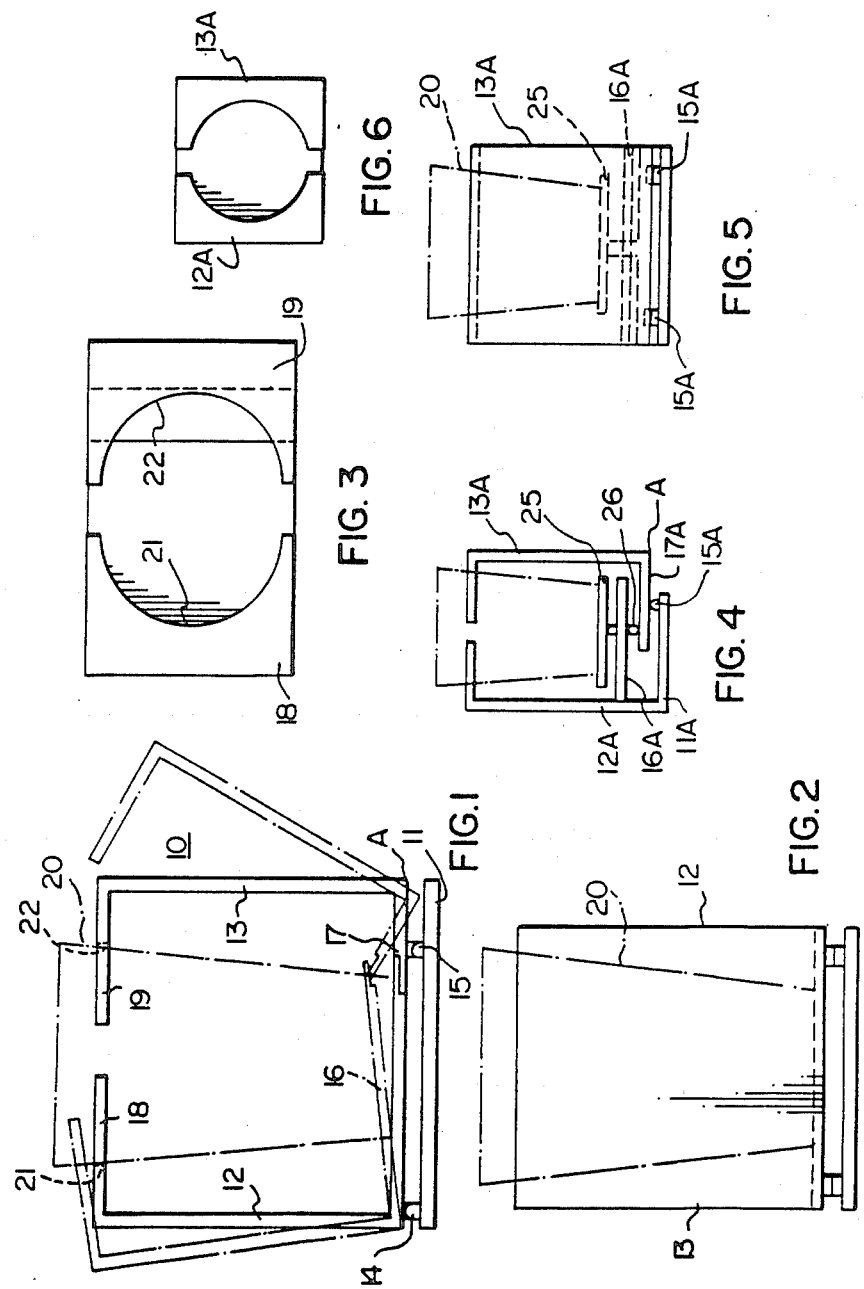

REFRESHMENT CUP HOLDER

FIELD OF INVENTION

This invention relates to a holder and more particularly to a holder that clampingly holds and releases a container containing refreshment, e.g. a cup of coffee, upon placing the same on the holder and lifting it therefrom.

BACKGROUND OF INVENTION

Holders for bottles of beer, cups of coffee and other refreshments consist generally of a recess or an aperture through a plate. In these holders the container is of smaller size than the aperture constituting a sloppy fit which is normally quite satisfactory for use in a stationary position. They are not, however, entirely satisfactory for use on boats or in cars as the motion of the same will cause the container to flop around resulting in spillage of the contents.

SUMMARY OF INVENTION

An object of the present invention is to provide a beverage container holder that clampingly grips the container upon placing the same thereon and automatically releases the same upon lifting the container off the holder.

In accordance with the present invention there is effectively provided a jaw that opens and closes to release and grasp a container with such movement being effected upon placing the container, with the contents therein, on the holder and removing the same therefrom.

LIST OF DRAWINGS

The invention is illustrated by way of example in the accompanying drawings wherein:

FIG. 1 is an elevational view of the container holder of the present invention;

FIG. 2 is a right hand side elvational view of FIG. 1;

FIG. 3 is a top plan view of FIG. 1;

FIG. 4 is an elevational view of a modified embodiment;

FIG. 5 is a right hand side elevational view of FIG. 4; and

FIG. 6 is a top plan view of FIG. 4.

DESCRIPTION OF PREFERRED EMBODIMENT

Referring to FIGS. 1 to 3 there is illustrated a cup holder 10 clampingly holding a beverage containing cup 20, e.g. a cup of coffee shown in broken line. The holder consists of a base 11 having a pair of U-shaped arms 12 and 13 pivotally mounted thereon by respective pivot joints 14 and 15. The U-shaped arms 12 and 13 have respective lower legs 16 and 17 with leg 17 being substantially shorter than leg 16 and the former resting on the latter. The arms 12 and 13 have respective upper legs 18 and 19 notched (part circular as shown or V-shaped) as at 21 and 22 providing a recess to receive the container 20. In the prior art, this recess is an aperture of fixed size. In the present invention it is variable in size, as will be readily apparent, and not only receives the container but grips the same and thus holds the container firmly in position.

The container 20 rests on the lower leg 16 and the pivots 14 and 15 are so arranged that the weight of the container, with the contents therein, causes the arms to pivot moving arms 18 and 19 inwardly in a direction toward one another thereby to grasp the container within the jaw provided by notches 21 and 22. The location of the pivots and distribution of the weight of the jaw members is such that members 12 and 13 pivot in the opposite direction when the container is removed whereby legs 18 and 19 move away from one another to an extent so as to disengage the container. In this position the throat of the jaw is larger than the container making it easy to place the container back in the holder.

Hinges 14 and 15 are shown as a protrusion on base member 11 that has a rounded end fitting into a socket, in a protrusion on respective legs 16 and 17. These, however, can readily be replaced by hinge pin arrangements.

FIGS. 4 and 6 illustrate a modification wherein one of the jaws is fixed and the other pivoted as opposed to having both jaw members pivoted as in the FIG. 1 embodiment. In FIG. 4 there is illustrated a fixed jaw 12A and a pivoted jaw 13A. The container 20, with the refreshment therein, rests upon a plunger 25 reciprocally mounted on a leg portion 16A spaced upwardly from a base flange 11A. A stem 26 projects down from plunger 25 through leg portion 16A and abuts leg 17 of jaw member 13A. Jaw member 13A is pivotally mounted by pegs 15A on the base 11A, which is rigidly formed with the jaw member 12A that projects into a socket recess in leg 17A. As before, the location of pivot 15A relative to the centre of gravity of jaw member 13A is such that the weight of, for example, a cup of coffee on plunger 25 closes the jaw which otherwise is in its wide open position.

The embodiments of the invention in which an exclusive property or privilege is claimed are defined as follows:

1. A device for releasably holding a cup of coffee, bottle of beer or the like refreshment comprising
    (a) a base;
    (b) a pair of jaw members carried by said base and projecting upwardly therefrom,
    (c) means pivotally mounting each of said jaw members on said base so that the free upper ends thereof are movable toward and away from one another respectively to grasp and release a refreshment container therebetween, said pivot mounting of one of said pair of jaw members being so located relative to the centre of gravity of such jaw member that the jaw is biased to an open position, and
    (d) a flange secured to and spaced downwardly from the upper free end of the respective jaw members, said flanges extending horizontally toward one another supporting thereon a container of beverage and wherein the flange of said one jaw member underlies and abuts the flange of the other jaw member causing the jaw to be normally open for receiving a container of beverage, said jaw being caused to move to a jaw closed position as a result of placing the container having beverage therein upon said flanges.

2. A device as defined in claim 1 wherein said flange on said one member is substantially shorter than the flange on said other jaw member.

* * * * *